June 1, 1926.
O. S. BOWMAN
ROTARY EXPANSION ENGINE
Filed June 7, 1921
1,586,775
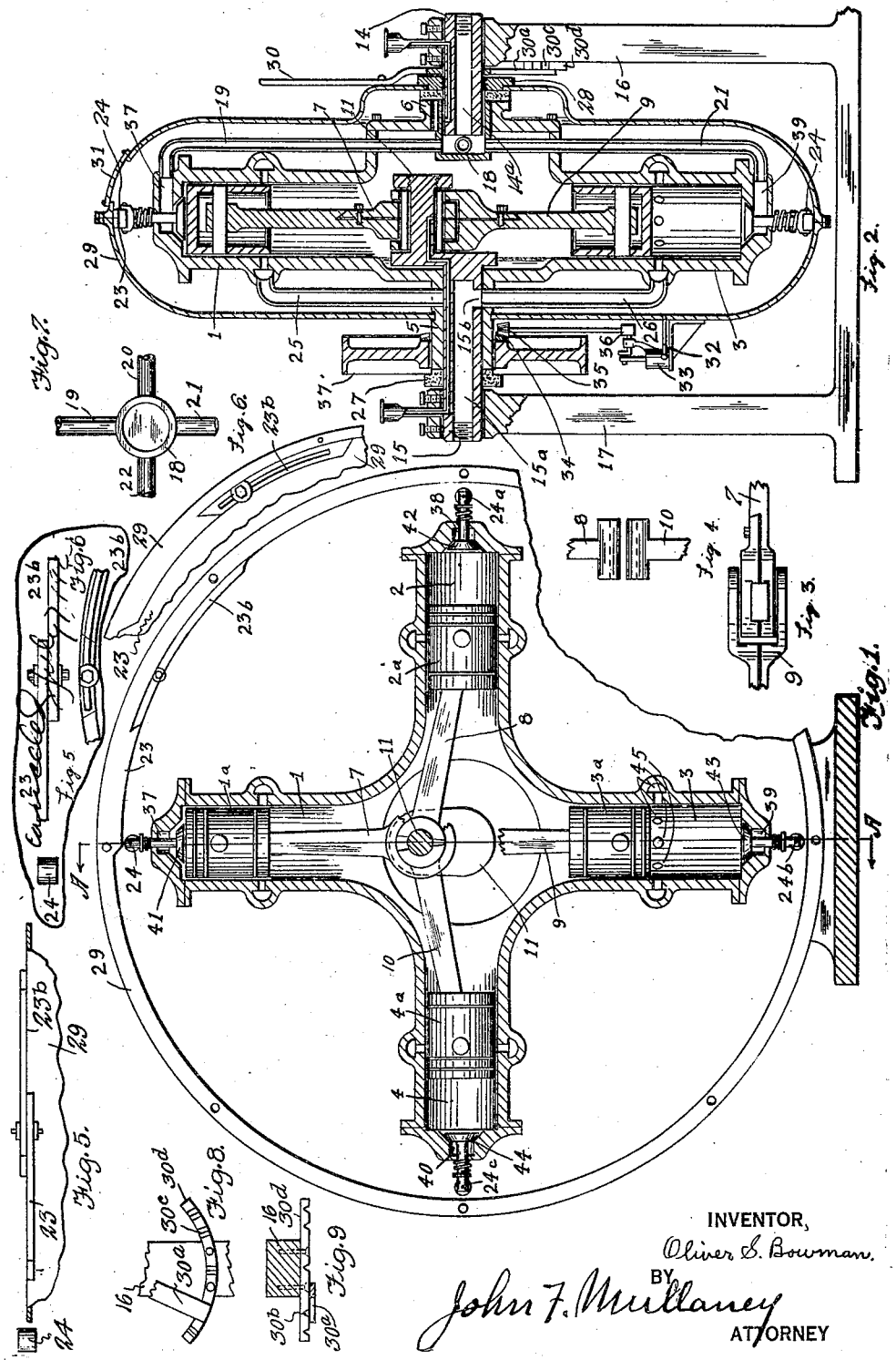
INVENTOR,
Oliver S. Bowman.
BY
John F. Mullaney
ATTORNEY Patented June 1, 1926.

1,586,775

UNITED STATES PATENT OFFICE.

OLIVER S. BOWMAN, OF COLORADO SPRINGS, COLORADO.

ROTARY EXPANSION ENGINE.

Application filed June 7, 1921. Serial No. 475,660.

My invention consists of a rotary expansion engine.

The principal object of my invention is to provide a rotary engine having a plurality of cylindrical expansion chambers, with movable pistons, rotatable (1) without heat loss from radiation, (2) without atmospheric friction, (3) without atmospheric resistance against the pistons and (4) without reciprocating motion.

In the accompanying drawings I have shown what I now consider the preferred form of an illustration embodying the essential features of my engine, and in these drawings:

Figure 1 is a vertical section through the cylinders;

Figure 2 is a vertical section of the engine on the line A—A in Figure 1;

Figures 3 and 4 show the bearing detail of the connecting rods;

Figures 5 and 6 show detail of the track operating valve cams, with means for adjusting cut-off;

Figure 7 shows detail of the distributing chamber, or pipe, and intake pipes;

Figure 8 is a fragmentary elevation showing the quadrant $30^d$.

Figure 9 is a plan view of Figure 8.

Referring to the drawings, my engine, as here shown, consists of four single-acting cylinders, 1, 2, 3, 4 (although I contemplate the use of a less or greater number), radiating from a common base forming a hub, 5 and 6. (As indicated in Fig. 2, 6 is not an integral part of said hub but is bolted thereon).

Hub 5—6 is supported by and has bearings on two fixed hollow shafts, 14, 15, serving also as main intake and exhaust ports respectively, and fixed by key or set screw in supports 16—17.

Connecting rods, 7, 8, 9, 10 (Figs. 1, 2, 3, 4) are all supported on crank 11, extending from shaft 15, and have a common bearing thereon; rods 8 and 10 being supported directly on said crank, while their elongated hubs (Fig. 4) furnish a supporting bearing for rods 7 and 9, which are split at the base to facilitate assembling.

Distributing chamber or pipe, 18 (Figs. 2, 7), extending through hub 6, is keyed thereto and forms its actual bearing on 14. Pipes 19, 20, 21, 22, extend from 18 to intake ports in cylinders 1, 2, 3, 4 respectively (pipes 19, 21 being clearly shown in Fig. 2), said intake ports being controlled by poppet valves, 41, 42, 43, 44 (Figs. 1, 2), and rollers 24, $24^a$, $24^b$, $24^c$, and cam track 23 (Figs. 1, 5, 6). Section 23 of the cam track is integral with one section of the casing 29 and section $23^b$ is movable to adjust the track lengthwise, as shown in Figure 5.

Pipes extend from the exhaust ports in each cylinder and rotate with them, only two of which, 25, 26, are shown in Fig. 2. Said pipes exhaust alternately through port $15^b$, extending downward from the hollow in shaft 15.

27—28 indicate "packing."

All rotatable parts are enclosed within an air-tight case, 29, resting on hubs 5, 6. By means of lever 30, this case, with cam-track 23, may be moved and the engine rotated in either direction. The lever 30 has a flexible extension $30^a$ provided with a lug $30^b$ which engages notches $30^c$ in quadrant $30^d$ and holds the case in the desired position.

The removal of plate 31 permits the adjustment of cam-track 23—$23^b$.

Vacuum pump 33, bracketed conveniently to case 29, and connected therewith by pipe 32, derives its motion from the main shaft via gears 34—35 and a screw enclosed within 36, and furnishes means for maintaining a vacuum in said case 29.

37 is the main belt pulley, although I contemplate the use of gears or other means of connection with the hub 5.

Means of lubricating bearings, including oil cups, pipes, etc., are plainly indicated in Fig. 2. The conventional method of injecting oil into live steam is implied for cylinder lubrication.

Referring to the operation of my engine:

Hub 5—6 supporting the cylinders and attached pipes, has bearings on and therefore rotates around hollow shafts 14—15, while the connecting rods, 7, 8, 9, 10, extending from pistons $1^a$, $2^a$, $3^a$, $4^a$, all have a bearing on, and therefore rotate around 11; the power stroke being twice the distance between the centers of 11 and 14—15, the same as if the cylinders were rigid and 11 and 15 rotated.

Steam passes through the opening $14^a$ in hollow shaft 14, thence into distributing chamber or pipe 18, thence into pipes 19, 20, 21, 22, thence into chambers 37, 38, 39, 40 (19, 21 being completely shown in Fig. 2). Contact of rollers 24, $24^a$, $24^b$, $24^c$ with circular track 23 alternately opens poppet valves 41, 42, 43, 44, permitting steam to enter cylinders 1, 2, 3, 4; said valves closing when the rollers leave track 23.

When each cylinder is at its lowest point, as indicated by cylinder 3 in Figs. 1, 2, its exhaust ports 45 are uncovered, the expanded steam exhausting through pipes 25 and 26 (and the other pipes not shown), through port 15$^b$ and the hollow 15$^a$, in pipe 15; 15$^b$ serving as an exhaust port for all the cylinders.

The "throttle" opening communication between steam boiler and 14$^a$ is not indicated.

My engine is reversed by swinging case 29 to a point which brings the reverse end of track 23 to the highest elevation. Said casing remaining stationary during the operation of the engine.

The ratio of cut-off to the piston stroke may be varied by moving 23$^a$ in the manner indicated.

By means of pump 33 a vacuum is maintained in casing 29.

I claim:

1. In a rotary expansion engine, including in combination two standards; a hollow shaft fixed in one standard and a hollow shaft fixed in the other standard; a crank on said last named hollow shaft, a hollow hub mounted on said hollow shafts and enclosing said crank; a plurality of cylinders, having intake ports in their heads and exhaust ports in their bases, mounted radially on said hub; pistons mounted in said cylinders; piston rods connecting said pistons and said crank; intake pipes extending radially from one hollow pipe into communication with the intake ports of said cylinders; pipes extending from the other hollow shaft into communication with the exhaust ports of said cylinders; a poppet valve mounted in the head of each cylinder; a case mounted on said hub; a cam roller on the stem of each poppet valve; a segment of circular track, adjustable with respect to its length, mounted in said case and adapted to cooperate with said cam rollers to open and close said valves and to time said opening and closing.

2. In a rotary expansion engine, including in combination two standards, a hollow shaft fixed in one standard and a hollow shaft fixed in the other standard; a crank on said last named hollow shaft; a hollow hub mounted on said hollow shafts and enclosing said crank; a plurality of cylinders, having intake ports in their heads and exhaust ports in their bases, mounted radially on said hub; pistons mounted in said cylinders; piston rods connecting said pistons and crank; intake pipes extending from one hollow pipe into communication with the intake ports of said cylinders; pipes extending from the other hollow shaft into communication with the exhaust ports of said cylinder; a poppet valve, carrying a cam roller on its stem, mounted in the head of each cylinder; a case mounted on said hub; a segment of circular track, adjustable with respect to its length, mounted in said case and adapted to cooperate with said cam rollers to open and close said valves and to time said opening and closing; a lever mounted on said case and adapted to swing said case and thereby reverse the motion of said hub and cylinders; a quadrant mounted on one of said standards and adapted to cooperate with said lever.

3. In a rotary expansion engine, a hub: a plurality of cylinders extending radially from said hub; valves in said cylinders; a case mounted movably on said hub; a segment of circular track, adjustable with respect to its length, mounted in said case and adapted to cooperate with the valves of said cylinders; for the purposes set forth.

4. In a rotary expansion engine, a hub; a plurality of cylinders mounted radially on said hub; valves in said cylinders; a case mounted movably on said hub; a segment of adjustable track mounted in said case and adapted to cooperate with the valves in said cylinders; a lever mounted on said case and adapted to swing said case on said hub to reverse the motion of said hub and cylinders, and a quadrant adapted to cooperate with said lever.

OLIVER S. BOWMAN.